US008088854B2

(12) United States Patent
Stimpson et al.

(10) Patent No.: US 8,088,854 B2
(45) Date of Patent: Jan. 3, 2012

(54) TEREPHTHALATES AS PLASTICIZERS IN VINYL ACETATE POLYMER COMPOSITIONS

(75) Inventors: Martin James Stimpson, Marlborough (GB); Mark Stephen Holt, Huntersville, NC (US)

(73) Assignee: Eastman Chemical Company, Kingsport, TN (US)

( * ) Notice: Subject to any disclaimer, the term of this patent is extended or adjusted under 35 U.S.C. 154(b) by 612 days.

(21) Appl. No.: 11/846,971

(22) Filed: Aug. 29, 2007

(65) Prior Publication Data
US 2008/0058450 A1 Mar. 6, 2008

Related U.S. Application Data

(60) Provisional application No. 60/841,073, filed on Aug. 30, 2006.

(51) Int. Cl.
*C08K 5/09* (2006.01)
(52) U.S. Cl. ........ 524/296; 524/297; 524/459; 524/503; 524/557; 156/327
(58) Field of Classification Search .................. 524/296, 524/297, 459, 503, 557; 156/327
See application file for complete search history.

(56) References Cited

U.S. PATENT DOCUMENTS

| | | | |
|---|---|---|---|
| 2,217,163 A * | 10/1940 | Fletcher ........................ 524/296 |
| 2,360,306 A * | 10/1944 | Nason ............................ 524/296 |
| 2,459,955 A * | 1/1949 | Osman et al. .................... 524/32 |
| 2,628,207 A | 2/1953 | Smith et al. |
| 3,224,995 A | 12/1965 | Pree |
| 3,431,239 A | 3/1969 | Morris et al. |
| 3,725,311 A | 4/1973 | Grubb |
| 3,764,374 A | 10/1973 | Barton et al. |
| 4,015,044 A | 3/1977 | Ranney et al. |
| 4,082,712 A | 4/1978 | Dannels |
| 4,110,261 A | 8/1978 | Newland |
| 4,221,688 A | 9/1980 | Johnson et al. |
| 4,253,898 A | 3/1981 | Rinker et al. |
| 4,331,579 A | 5/1982 | Haemer |
| 4,362,783 A | 12/1982 | Graham |
| 4,366,307 A | 12/1982 | Singh et al. |
| 4,376,144 A | 3/1983 | Goettler |
| 4,401,720 A | 8/1983 | Davis et al. |
| 4,414,267 A | 11/1983 | Coran et al. |
| 4,515,909 A | 5/1985 | Sawano et al. |
| 4,562,173 A | 12/1985 | Terano et al. |
| 4,599,376 A | 7/1986 | Takimoto et al. |
| 4,605,465 A | 8/1986 | Morgan |
| 4,654,390 A | 3/1987 | Siegel |
| 4,666,765 A | 5/1987 | Caldwell et al. |
| 4,764,449 A | 8/1988 | Vanlseghem |
| 4,792,464 A | 12/1988 | Martenson |
| 4,806,590 A | 2/1989 | Padget et al. |
| 4,900,771 A | 2/1990 | Gerace et al. |
| 4,975,480 A | 12/1990 | Bullen |
| 5,071,690 A | 12/1991 | Fukuda et al. |
| 5,179,138 A | 1/1993 | Uemura et al. |
| 5,236,883 A | 8/1993 | Nakazawa et al. |
| 5,288,797 A | 2/1994 | Khalil et al. |
| 5,326,845 A | 7/1994 | Linden |
| 5,338,788 A | 8/1994 | Miyataka et al. |
| 5,366,550 A | 11/1994 | Schad |
| 5,401,708 A | 3/1995 | Shimizu et al. |
| 5,454,801 A | 10/1995 | Lauritzen |
| 5,476,889 A | 12/1995 | Owen |
| 5,489,618 A | 2/1996 | Gerkin |
| 5,492,960 A | 2/1996 | Muehlbauer et al. |
| 5,494,707 A | 2/1996 | Wang et al. |
| 5,519,072 A | 5/1996 | Wieczorek, Jr. et al. |
| 5,523,344 A | 6/1996 | Maksymkiw et al. |
| 5,534,609 A | 7/1996 | Lewis et al. |
| 5,535,469 A | 7/1996 | Terry |
| 5,539,011 A | 7/1996 | Hilker et al. |
| 5,559,175 A * | 9/1996 | Kroggel et al. ................ 524/297 |
| 5,571,860 A | 11/1996 | Kukkala et al. |
| 5,659,001 A | 8/1997 | de la Croi Habimana et al. |
| 5,670,225 A | 9/1997 | Yamanaka et al. |
| 5,681,631 A | 10/1997 | Steelman et al. |
| 5,698,621 A | 12/1997 | Nguyen et al. |
| 5,750,278 A | 5/1998 | Gillett et al. |
| 5,869,589 A | 2/1999 | Raynolds et al. |
| 5,877,268 A | 3/1999 | Jorgenson et al. |
| RE36,233 E | 6/1999 | Hilker et al. |
| 5,919,716 A | 7/1999 | Raynolds et al. |
| 6,034,168 A | 3/2000 | Wang |

(Continued)

FOREIGN PATENT DOCUMENTS

CA 2 485 133 A1 11/2003

(Continued)

OTHER PUBLICATIONS

PCT International Search Report and Written Opinion with Mail Date of Jan. 25, 2008 for PCT/US2007/019060 Application.

(Continued)

*Primary Examiner* — Peter D Mulcahy
(74) *Attorney, Agent, or Firm* — William K. McGreevey; Bernard J. Graves, Jr.

(57) ABSTRACT

An aqueous composition adhesive composition comprising a vinyl acetate polymer and a plasticizer having the general formula:

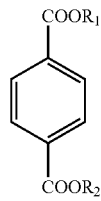

wherein $R_1$ and $R_2$ are independently selected from the group consisting of saturated straight or branched and unsubstituted alkyl or cycloalkyl groups having from 4 to 8 carbon atoms.

50 Claims, No Drawings

U.S. PATENT DOCUMENTS

| | | | |
|---|---|---|---|
| 6,127,026 A | 10/2000 | Bonk et al. |
| 6,136,884 A | 10/2000 | Chen et al. |
| 6,136,900 A | 10/2000 | Kuhn et al. |
| 6,187,125 B1 | 2/2001 | Rustad et al. |
| 6,221,991 B1 | 4/2001 | Letchford et al. |
| 6,231,849 B1 | 5/2001 | Schiller |
| 6,235,830 B1 | 5/2001 | Ohmori et al. |
| 6,245,437 B1 | 6/2001 | Shiiki et al. |
| 6,284,077 B1 | 9/2001 | Lucas et al. |
| 6,299,864 B1 | 10/2001 | Chen et al. |
| 6,303,184 B1 | 10/2001 | Lobo et al. |
| 6,323,275 B2 | 11/2001 | Takahashi et al. |
| 6,391,405 B1 | 5/2002 | Bonk et al. |
| 6,414,044 B2 | 7/2002 | Taylor |
| 6,414,077 B1 | 7/2002 | Barron et al. |
| 6,433,097 B1 | 8/2002 | Nixon et al. |
| 6,437,071 B1 | 8/2002 | Odaka et al. |
| 6,479,584 B1 | 11/2002 | Nakagawa et al. |
| 6,582,786 B1 | 6/2003 | Bonk et al. |
| 6,630,534 B1 | 10/2003 | Tanaka et al. |
| 6,638,992 B1 | 10/2003 | Chen et al. |
| 6,656,988 B1 | 12/2003 | Fischer et al. |
| 6,656,998 B1 | 12/2003 | Robeson et al. |
| 6,670,419 B2 | 12/2003 | Lau |
| 6,675,560 B2 | 1/2004 | Gott et al. |
| 6,706,399 B1 | 3/2004 | George et al. |
| 6,749,836 B1 | 6/2004 | Chen et al. |
| 6,749,861 B2 | 6/2004 | Mullen |
| 6,750,278 B2 | 6/2004 | Patil et al. |
| 6,762,239 B1 | 7/2004 | Williams |
| 6,784,240 B2 | 8/2004 | Hasegawa et al. |
| 6,803,403 B2 | 10/2004 | Ishihara |
| 6,809,147 B1 | 10/2004 | Ohno et al. |
| 6,825,278 B2 | 11/2004 | Holub et al. |
| 6,833,423 B2 | 12/2004 | Roesler |
| 6,849,675 B2 | 2/2005 | Sullivan |
| 6,855,765 B2 | 2/2005 | Chew et al. |
| 6,858,260 B2 | 2/2005 | Taylor et al. |
| 6,864,317 B1 | 3/2005 | Kitano et al. |
| 6,872,454 B2 | 3/2005 | Newberth, III et al. |
| 6,884,840 B2 | 4/2005 | Gleichenhagen et al. |
| 6,887,964 B2 | 5/2005 | Frisch et al. |
| 6,896,736 B2 | 5/2005 | Lee et al. |
| 6,900,265 B2 | 5/2005 | Schultz et al. |
| 6,933,350 B1 | 8/2005 | Nakagawa et al. |
| 6,946,509 B2 | 9/2005 | He |
| 6,958,149 B2 | 10/2005 | Vukicevic et al. |
| 6,960,619 B2 | 11/2005 | Figovsky et al. |
| 6,964,999 B1 | 11/2005 | Nakagawa et al. |
| 6,977,277 B2 | 12/2005 | Patil et al. |
| 6,979,716 B1 | 12/2005 | Nakagawa et al. |
| 7,012,148 B2 | 3/2006 | Curphey |
| 7,019,068 B2 | 3/2006 | Bodart et al. |
| 7,208,464 B2 | 4/2007 | Heltovics et al. |
| 7,361,779 B1 | 4/2008 | Holt et al. |
| 2003/0074833 A1 | 4/2003 | Wood et al. |
| 2004/0097625 A1 | 5/2004 | Bodart et al. |
| 2005/0020718 A1 | 1/2005 | Gosse et al. |
| 2005/0262758 A1 | 12/2005 | Allison et al. |
| 2006/0106168 A1 | 5/2006 | Ota et al. |
| 2006/0276339 A1 | 12/2006 | Windsor et al. |
| 2007/0012140 A1 | 1/2007 | Howlett et al. |
| 2007/0037926 A1 | 2/2007 | Olsen et al. |
| 2007/0110791 A1 | 5/2007 | Myhra |
| 2007/0128148 A1 | 6/2007 | Whitehead et al. |
| 2007/0172382 A1 | 7/2007 | Uchiyama et al. |
| 2007/0179229 A1 | 8/2007 | Grass |
| 2007/0230189 A1 | 10/2007 | Gruenbacher et al. |
| 2008/0054089 A1 | 3/2008 | Oldfield et al. |
| 2008/0057317 A1 | 3/2008 | Kettner et al. |
| 2008/0058450 A1 | 3/2008 | Stimpson et al. |

FOREIGN PATENT DOCUMENTS

| | | |
|---|---|---|
| CA | 2 624 332 A1 | 4/2007 |
| CA | 2 595 012 A1 | 2/2008 |
| CN | 1651229 A | 8/2005 |
| DE | 44 15 888 A1 | 11/1994 |
| DE | 100 16 086 A1 | 10/2000 |
| DE | 102006001795 A1 | 7/2007 |
| EP | 0 397 245 A2 | 11/1990 |
| GB | 851753 A | 10/1960 |
| GB | 985143 | 3/1965 |
| JP | 64-45452 A | 2/1989 |
| JP | 08 020668 A | 1/1996 |
| JP | 8-020668 A | 1/1996 |
| JP | 2006 193603 A | 7/2006 |
| WO | 91/17302 A1 | 11/1991 |
| WO | WO 92/18601 A1 | 10/1992 |
| WO | WO 03029339 A1 | 4/2003 |

OTHER PUBLICATIONS

PCT International Search Report and Written Opinion with Mail Date of Jan. 31, 2008 for PCT/US2007/019004 Application.

PCT International Search Report and Written Opinion with Mail Date of Feb. 26, 2008 for PCT/US2007/019003 Application.

Co-pending U.S. Appl. No. 11/846,953, filed Aug. 29, 2007; now published as US 2008/0057317 A1 referenced above.

Co-pending U.S. Appl. No. 11/846,968, filed Aug. 29, 2007; now published as US 2008/0054089 A1 referenced above.

Co-pending U.S. Appl. No. 11/202,543, filed Aug. 12, 2005; now published as US 2007/0037926 A1 referenced above.

Office Action with Mail Date of Jan. 23, 2008 for co-pending U.S. Appl. No. 11/202,542, Olsen et al.

Office Action with Mail Date of Oct. 29, 2008 for co-pending U.S. Appl. No. 11/202,543, Olsen et al.

Beeler, A. Don; "Terephthalate Esters A New Class of Plasticizers for Polyvinyl Chloride"; Society of Plastics Engineers; 34$^{th}$ Annual Technical Conference; Chalfonte-Haddon Hall, Atlantic City, New Jersey; Apr. 26-29, 1976.

Hansen, C.M.; "Hansen Solubility Parameters—A User's Handbook"; pp. 9-10, 167-185; CRC Press, Boca Raton, FL.

Herman, Stephen J.; Edited by David Rowe; "Chemistry and Technology of Flavors and Fragrance", "Chapter 13, Applications II: Fragrance"; Blackwell Publishing (2004); pp. 310.

Notification of Transmittal of the International Search Report and Written Opinion of the International Searching Authority, or the Declaration date of mailing Dec. 27, 2006 received in International Application No. PCT/US2006/031465.

Office Action with Mail Date of Apr. 30, 2009 for co-pending U.S. Appl. No. 11/202,543, Olsen et al.

Office Action with Notification Date of Jan. 4, 2010 for co-pending U.S. Appl. No. 11/202,543.

Office Action with Notification Date of Mar. 31, 2010 for co-pending U.S. Appl. No. 11/846,953.

Office Action with Mail Date of Apr. 9, 2009 for U.S. Appl. No. 11/846,968.

Office Action with Notification Date of Dec. 3, 2009 for U.S. Appl. No. 11/846,968.

Science Lab.com, MSDS-Dibutyl-phthalate-9927152 section 1 (Oct. 10, 2005 updated Nov. 6, 2008).

United Nations Environment Programme, Geneva, 1997 Env Health Criteria No. 189, p. 20/129, Section 3.2.2—Di-n-butyl Phthalate.

Vandezande, et al.; "Chapter 16—Vinyl Acetate Polymerization," Emulsion Polymerization and Emulsion Polymers; 1997; pp. 563-587; John Wiley & Sons Ltd.

Daniels, W., "Vinyl Ester Polymers," Kirk-Othmer, Encyclopedia of Chemical Technology, pp. 393-425; vol. 17; John Wiley and Sons, New York.

\* cited by examiner

TEREPHTHALATES AS PLASTICIZERS IN VINYL ACETATE POLYMER COMPOSITIONS

CROSS REFERENCE TO RELATED APPLICATION

This application claims priority to U.S. Provisional Patent Application No. 60/841,073, filed Aug. 30, 2006.

FIELD OF THE INVENTION

The present invention relates to vinyl ester polymer compositions, and particularly aqueous compositions that contain vinyl acetate polymers (commonly referred to as "vinyl polymer emulsions") and one or more $C_4$ to $C_8$ alkyl terephthalates.

BACKGROUND OF THE INVENTION

Aqueous compositions containing vinyl acetate polymers have widespread applications in the area of adhesives and coatings. For example, stabilized aqueous polymer compositions containing vinyl acetate polymers have applications as adhesives for paper packaging and converting, woodwork, vinyl laminating, woven and non-woven fabrics, films, metallic foils and metallized films, and flexible cellular material such as polyurethane foams or sponge rubber. The adhesives are often prepared with polymers synthesized using emulsion polymerization and as such, are commonly referred to as "polymer emulsions." On evaporation or removal of the aqueous medium, the compositions cure or harden at room temperature to form a bond which is desirably characterized by high strength and resistance to heat, humidity and water. Some examples of vinyl acetate polymer aqueous emulsion compositions can be found in U.S. Pat. Nos. 5,571,860, 6,803,403 and 6,762,239.

Additives such as plasticizers are useful with vinyl acetate polymer adhesive compositions, for example to provide lower glass transition temperatures, lower minimum film forming temperatures, and higher viscosities. However, there is a continuing need for new plasticizers for such uses.

SUMMARY OF THE INVENTION

The present invention is an aqueous composition containing at least one vinyl acetate polymer and at least one $C_4$ to $C_8$ alkyl terephthalate. The invention further includes articles containing the adhesives of the present invention. The invention further including methods of making and using the adhesives of the present invention.

Thus, the invention provides aqueous compositions that contain at least one vinyl acetate polymer, and at least one plasticizer comprising at least one $C_4$ to $C_8$ alkyl terephthalate, wherein the $C_4$ to $C_8$ alkyl terephthalate is present in an amount of at least about 6% based on the total dry components of the composition. In some embodiments, the composition is an adhesive composition that includes an aqueous solution containing particles suspended in a stable emulsion in the aqueous solution. The particles contain at least one vinyl acetate polymer and at least one $C_4$ to $C_8$ alkyl terephthalate, and the $C_4$ to $C_8$ alkyl terephthalate is present in an amount of at least about 6% based on the total dry components of the composition.

The invention further provides aqueous compositions comprising at least one vinyl acetate polymer, and di-n-butyl terephthalate. In some embodiments, the composition is an adhesive composition that includes an aqueous solution containing particles suspended in a stable emulsion in the aqueous solution. The particles contain at least one vinyl acetate polymer and di-n-butyl terephthalate.

The invention further provides methods of making one or more of the compositions of the present invention. In some embodiments, the method includes combining an aqueous solution containing at least one vinyl acetate polymer (such as a stable emulsion of particles that contain the polymer) with the $C_4$ to $C_8$ alkyl terephthalate.

The invention further provides articles containing any of the compositions of the present invention.

DETAILED DESCRIPTION OF THE INVENTION

Disclosed herein are adhesive aqueous compositions that contain one or more vinyl acetate polymers and one or more $C_4$ to $C_8$ alkyl terephthalates. The composition has a wide variety of adhesive applications, including woodworking, paper packaging and converting, vinyl laminating, metal to wood adhesives, vacuum forming adhesives, and bonding various paper and nonwoven substrates. The invention further provides articles that include the compositions of the present invention. The invention further includes methods of making and using the adhesives of the present invention. The invention further includes methods of applying adhesives that are the compositions of the present invention.

Compositions of the Present Invention

The compositions of the present invention are aqueous compositions comprising at least one vinyl acetate polymer and at least one $C_4$ to $C_8$ alkyl terephthalate. By "aqueous composition" or "aqueous solution," it is meant that the composition contains water in an amount of at least about 25% by weight. In some embodiments, the water is present in an amount of at least 40% by weight. In some embodiments, the water is present in an amount of 35 to 55% by weight. In some embodiments, the water is present in an amount of 40 to 50% by weight. In some embodiments, the aqueous composition is a stable emulsion of particles that contain the vinyl acetate polymer and the $C_4$ to $C_8$ alkyl terephthalate. By "stable emulsion," it is meant that the particles do not require agitation or heating to avoid separation at standard pressure (1 atmosphere) and room temperature (22° C.), typically due to the presence of stabilizing or emulsifying compounds. Several stable emulsions of vinyl acetate polymers are known in the art. In some embodiments, the compositions are air-curable, meaning that they cure at room temperature and standard pressure by means of evaporation of the water in the compositions, without any need for heating or irradiation to cause a chemical curing process.

In some embodiments, the vinyl acetate polymer is present in the composition in the form of an aqueous dispersion at a solids level in the range of about 30 to about 65% by weight, or within a narrower subrange such as about 35-60%, about 30-40%, about 50-60%, about 55-60%, about 55-65%, and the like. In some embodiments the vinyl acetate polymer is present at levels of about 50 to about 90% parts by weight per 100 parts of the unsolvented (i.e. dry) formulation or a narrower subrange (e.g. about 60 to about 80%).

In some embodiments, the $C_4$ to $C_8$ alkyl terephthalate is present in amounts of about 0.01 to about 30 weight % of the adhesive composition. In some embodiments, the $C_4$ to $C_8$ alkyl terephthalate is present in amounts of from 3% to 30 weight %. In some embodiments, the $C_4$ to $C_8$ alkyl terephthalate is present in amounts of at least about 3% by weight. In some embodiments, the $C_4$ to $C_8$ alkyl terephthalate is present in amounts of from 0.01 to 10 weight %. In some embodiments, the $C_4$ to $C_8$ alkyl terephthalate is present in amounts of from 3 to 10 weight %. In some embodiments, the $C_4$ to $C_8$ alkyl terephthalate is present in amounts of from 3 to 15 weight %. In some embodiments, the $C_4$ to $C_8$ alkyl terephthalate is present in amounts of from 10 to 30 weight %. In some embodiments, the $C_4$ to $C_8$ alkyl terephthalate is present in amounts of from 8% to 20 weight %. In some embodiments, the $C_4$ to $C_8$ alkyl terephthalate is present in amounts of from 6 to 30 weight %. In some embodiments, the $C_4$ to $C_8$ alkyl terephthalate is present in amounts of from 8 to 30 weight %. In some embodiments, the $C_4$ to $C_8$ alkyl terephthalate is present in amounts of from 5% to 8 weight %. In some embodiments, the $C_4$ to $C_8$ alkyl terephthalate is in amounts of at least about 3% by weight. In some embodiments, the $C_4$ to $C_8$ alkyl terephthalate is in amounts of at least about 4% by weight. In some embodiments, the $C_4$ to $C_8$ alkyl terephthalate is in amounts of at least about 5% by weight. In some embodiments, the $C_4$ to $C_8$ alkyl terephthalate is in amounts of at least about 6% by weight. In some embodiments, the $C_4$ to $C_8$ alkyl terephthalate is in amounts of at least about 7% by weight. In some embodiments, the $C_4$ to $C_8$ alkyl terephthalate is in amounts of at least about 8% by weight. In some embodiments, the $C_4$ to $C_8$ alkyl terephthalate is in amounts of at least about 10% by weight. Any useful weight ranges of the terephthalates may be used. Thus, embodiments exist for each of the above weight percentages where such percentages are based on total weight of the compositions (i.e. weight including water or any other solvents). However, embodiments also exist in which the $C_4$ to $C_8$ alkyl terephthalate is present in each of the above weight ranges based on the total dry weight of the adhesive composition, (i.e. excluding the weight of water and any other liquid solvents). Thus, combinations of total and dry weights also exist. For example, in some embodiments, the $C_4$ to $C_8$ alkyl terephthalate is present in amounts of at least about 3% by weight based on the total weight of composition, and at least about 6% by weight based on the dry weight; at least about 5% by weight based on the total weight of composition, and at least about 6% by weight based on the dry weight; at least about 5% by weight based on the total weight of composition, and at least about 10% by weight based on the dry weight; at least about 7% by weight based on the total weight of composition, and at least about 10% by weight based on the dry weight, and so on.

$C_4$ to $C_8$ Alkyl Terephthalates

As used throughout this application, "$C_4$ to $C_8$ alkyl terephthalate" means a compound having a structure described by Formula I:

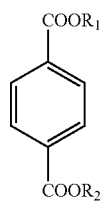

wherein $R_1$ and $R_2$ are each branched or unbranched alkyl or cycloalkyl groups of from 4 to 8 saturated and unsubstituted carbon atoms and wherein $R_1$ and $R_2$ may have identical or differing structures meeting the foregoing description. Any suitable alkyl or cycloalkyl groups can be used, but some examples include 2-ethylhexyl, n-octyl, 2 methyl pentyl, isobutyl, n-butyl, tert-butyl, pentyl, isopentyl, neopentyl, hexyl, heptyl, iso-heptyl and the like. Any such alkyl or cycloalkyl group may be used. In various embodiments, the terephthalate may be selected from a smaller group of terephthalates, such as $C_4$ to $C_7$ alkyl terephthalates, $C_4$ to $C_6$ alkyl terephthalates, $C_6$ to $C_8$ alkyl terephthalates or $C_5$ to $C_8$ alkyl terephthalates, or even smaller groups such as $C_4$ to $C_5$ alkyl terephthalates, $C_5$ to $C_6$ alkyl terephthalates, $C_6$ to $C_7$ alkyl terephthalates or $C_7$ to $C_8$ alkyl terephthalates. In some embodiments, $R_1$ and $R_2$ are both n-butyl groups, making the terephthalate a di-n-butyl terephthalate. In some embodiments, $R_1$ and $R_2$ are both isobutyl groups, making the terephthalate an isobutyl terephthalate. In some embodiments, $R_1$ and $R_2$ are both 2-ethylhexyl groups, making the terephthalate a bis 2-ethylhexyl terephthalate, also commonly referred to di-2-ethylhexyl terephthalate (DEHT) or dioctyl terephthalate (DOTP), which is a component of 168 Plasticizer available from Eastman Chemical Company. In some embodiments, the $C_4$ to $C_8$ alkyl terephthalate is selected from di-n-butyl terephthalate, di-2-ethylhexyl terephthalate and mixtures thereof. In some embodiments, the $C_4$ to $C_8$ alkyl terephthalate is selected from di-n-butyl terephthalate, di-isobutyl terephthalate and mixtures thereof.

Vinyl Acetate Polymers

As used throughout this application, "vinyl acetate polymer" means any polymer that is the reaction product of polymerization of monomers that include vinyl acetate and thus contain repeating monomers that are residues of the polymerization of vinyl acetate monomers, in which at least 80% by weight of the monomers of vinyl acetate polymers are residues of vinyl acetate monomers or are a combination of residues of vinyl acetate monomers and ethylene monomers. Vinyl acetate polymers include homopolymers formed from only vinyl acetate monomers and polymers that are the reaction product of vinyl acetate monomers along with one or more other monomers (e.g. copolymers, terpolymers, etc.). In some embodiments the polymer has from about 50 to 100 weight %, based on the total weight of the polymer, of vinyl acetate monomer residues. In some embodiments of the invention, the polymer has from about 65 to 100 weight %, based on the total weight of the polymer, of vinyl acetate monomer residues. In some embodiments, the polymer has from about 80 to 100 weight %, based on the total weight of the polymer, of the vinyl acetate monomer residues. In some embodiments, vinyl acetate monomer residues are present in the polymer in an amount of from about 80 to about 98 weight %, based on the total weight of the polymer. In some embodiments, vinyl acetate monomer residues are present in the polymer in an amount of from about 80 to about 93 weight %, based on the total weight of the polymer. In some embodiments, vinyl acetate monomer residues are present in the polymer in an amount of from about 80 to about 90 weight %, based on the total weight of the polymer.

In some embodiments, the polymer includes up to 80% by weight of residues of other ethylenically unsaturated copolymerizable monomers. For example, in some embodiments the monomers include one or more residues of alpha-olefins such as ethylene, propylene, butene, pentene, hexene, heptene, octene, or nonene. In some embodiments, the monomers include one or more residues of ethylenically unsaturated esters such as ethyl hexyl acrylate or dibutyl maleate. In some embodiments, the monomers include one or more residues of ethylenically unsaturated carboxylic acids such as acrylic acid, methacrylic acid, or maleic acid. In some embodiments, the monomers include residues of one or more vinyl esters such as vinyl formate, vinyl acetate, vinyl propionate, vinyl butyrate, vinyl isobutyrate, vinyl valerate, vinyl 2-ethyl-hexanoate, vinyl isoctanoate, vinyl nonoate, vinyl decanoate, vinyl pivalate, or vinyl versatate, in each case referring to cis and trans isomers and combinations thereof. In some embodiments, the polymer includes residues of combinations of two or more of the foregoing monomers.

In some embodiments, the polymer is a copolymer formed from ethylene and vinyl acetate. The exact amount of ethylene used may vary depending upon the specific end use of the composition and any amount is within the scope of the invention. In some embodiments, ethylene monomer residues are present in the copolymer in an amount from about 2 to about 50 weight %, based on the total weight of the copolymer. In some embodiments, ethylene monomer residues are present in the copolymer in an amount from about 2 to about 20 weight %, based on the total weight of the copolymer. In some embodiments, ethylene monomer residues are present in the copolymer in an amount from about 7% to about 20 weight %, based on the total weight of the copolymer. In some embodiments, ethylene monomer residues are present in the copolymer in an amount from about 9% to about 20 weight %, based on the total weight of the copolymer. In some embodiments, ethylene monomer residues are present in the copolymer in an amount from about 10% to about 20 weight %, based on the total weight of the copolymer. In some embodiments, ethylene monomer residues are present in the copolymer in an amount from about 10% to about 40 weight %, based on the total weight of the copolymer.

In some embodiments the polymer includes residues of crosslinkable monomers. Any effective type of crosslinking agents can be used, including those that crosslink during polymerization or that crosslink after polymerization. Some examples of crosslinkers that react during polymerization type include divinyl adipate, and divinyl succinate, divinyl ether, diallyl ether, triallyl cyanurate, diallyl fumarate, triallyl citrate, and diallyl maleate, and other di- or tri-allyl compounds such as diallyl melamine. Some examples of the post-reactive type crosslinking agents are glycidyl compounds such as allyl glycidyl ether, glycidyl acrylate, glycidyl methacrylate, glycidyl vinyl ether, and the like; N-methylol compounds, such as N-methylol acrylamide, N-methylol methacrylamide, and their alkyl ethers, e.g., their methyl or butyl ethers.

In some embodiments of the present invention, the vinyl acetate polymer may also include residues of acrylate monomers, methacrylate monomers, monomers having a carboxylic acid group, monomers containing a sulfonic acid group, monomers containing a phosphoric acid group or nitrogen containing monoolefinically unsaturated monomer. Some examples of carboxylic acid containing monomers include $C_3$-$C_{10}$ alkenoic acids, and $\alpha$, $\beta$-unsaturated $C_4$-$C_{10}$ alkenedioic acids. Some examples of sulfonic acid functionalized monomer include styrene sulfonic acid, 2-acrylamido-2-methylpropane sulfonic acid, and sodium vinyl sulfonate. Some examples of phosphoric acid functionalized monomers include styrene phosphoric acid, sodium vinyl phosphonate, and $CH_2$=$C(CH_3)COO(CH_2)NOPO_3H$, wherein n is from 2 to 4. Some examples of nitrogen containing monoolefinically unsaturated monomer include nitriles, amides, N-methylol amides, $C_1$-$C_4$ alcoholic ethers of N-methylol amides, allylcarbamates, and lower alkyl ethers or lower alkanoic acid esters of N-methylol acrylamide.

The polymer may also include residues of monomers which assist in the stability of the composition. Some examples include vinyl sulfonic acid and 2-acrylamido-2-methylpropane sulfonic acid or salts thereof.

Other Components in the Composition

The compositions of the present invention can also contain a secondary plasticizer selected from any plasticizer conventionally used in vinyl acetate-based or ethylene vinyl acetate-based adhesives. Some examples of secondary plasticizers utilized in the adhesive compositions include, for example, acetyl tributyl citrate, butyl benzyl phthalate, butyl phthalyl butyl glycolate, dibutyl phthalate, glycerol triacetate (triacetin), dibutyl sebacate, diethyl phthalate, diethylene glycol dibenzoate, dipropylene glycol dibenzoate, triethylene glycol dibenzoate, dipropylene glycol, an alkyl benzoate, ethyl phthalyl ethyl glycolate, ethyl-p-toluene sulfonamide, hexylene glycol, ethyl phthalyl ethyl glycolate, polyoxyethylene aryl ether, diisobutylphthalate, 2,2,4-trimethyl-1,3-pentanediol diisobutyrate, tributoxyethyl phthalate, triethylene glycol dibenzoate, phthalic acid, or combinations of any two or more of the foregoing (e.g. a combination of triacetin and 2,2,4-trimethyl-1,3-pentanediol diisobutyrate). Liquid polyesters or sulfonated types of plasticizers may also be used. In some embodiments, the secondary plasticizer is present in an amount less than about 60 weight % of the total weight of plasticizers present in the adhesive composition. In some embodiments, the secondary plasticizer is less than about 20 weight % of the total weight of plasticizers in the adhesive composition. In some embodiments, the secondary plasticizer is less than about 10 weight % of the total weight of plasticizers in the adhesive composition.

The vinyl acetate dispersion may optionally contain polyvinyl alcohol. In some embodiments the polyvinyl alcohol is used at levels of 0.1 to 10 parts based on the total weight of the composition. In some embodiments the polyvinyl alcohol is used at levels of 0.5 to 5.0 parts based on the total weight of the composition. In some embodiments the polyvinyl alcohol is used at levels of 1 to 6 parts based on the total weight of the composition. Polyvinyl alcohols can act as stabilizers in some embodiments.

The composition of the present invention may contain any other desired or useful components such as emulsifiers, tackifiers, thickeners, defoamers, preservatives, surfactants, fillers, humectants and the like. Some examples of suitable tackifiers include coumarone-indene, ester gum, gum rosin, hydrocarbon resins, hydrogenated rosin, phenolic modified hydrocarbon resins, rosin esters, tall oil rosins, terpene phenolic, terpene resins, toluene-sulfonamideformaldehyde resin, and wood rosin. Some examples of suitable thickeners include oliginates, bentonite, casein, fumed silica, guar gum, gum tragacanth, hydroxyethylcellulose, locust bean gum, methylcellulose, polyacrylic acid salts (ammonium, potassium sodium), polyvinyl alcohol, sodium carboxymethyl cellulose, and starches. Some examples of suitable fillers include bentonite, calcium carbonate, calcium silicate, clay, mica, nut shell flours, silica, talc, uncooked starches, and wood flour. Some examples of suitable humectants include calcium chloride, diethylene glycol, glycerine, hexylene glycol, propylene glycol, magnesium chloride, sodium nitrate, sorbitol, sucrose, and urea. Some examples of anionic emulsifiers include alkyl sulfonates, alkylaryl sulfonates, alkyl sulfates, sulfates of hydroxyalkanols, alkyl and alkylaryl disulfonates, sulfonated fatty acids, sulfates and phosphates of polyethoxylated alkanols and alkylphenols, as well as esters of sulfosuccinic acid. Some examples of suitable non-ionic emulsifiers include the addition products of 5 to 50 moles of ethylene oxide adducted to straight-chained and branch-chained alkanols with 6 to 22 carbon atoms, or alkylphenols, or higher fatty acids, or higher fatty amides, or primary and secondary higher alkyl amines; as well as block copolymers of propylene oxide with ethylene oxide and mixtures thereof.

Articles

The invention further includes articles comprising the composition of the present invention. The articles may include, for example, an article to which a composition of the present invention has been applied as an adhesive to two or more articles or members of an article. Some examples include paper, cardboard, and packaging materials.

Methods

The invention further includes methods of formulating the compositions of the present invention. In some embodiments, the method includes combining at least one $C_4$ to $C_8$ alkyl terephthalate and at least one vinyl acetate polymer. In some embodiments, the method is a method to enhance the viscosity of a stable emulsion of vinyl acetate polymer particles, and comprises combining at least one $C_4$ to $C_8$ alkyl terephthalate with such emulsion.

Methods of using the compositions are also within the invention. In some embodiments, the composition is applied to an article, an opening in an article, or a juncture, joint, or connection between two or more articles or members of an article. Any effective methods can be used, and several are known in the art.

The present invention is illustrated in greater detail by the specific examples presented below. It is to be understood that these examples are illustrative embodiments and are not intended to be limiting of the invention, but rather are to be construed broadly within the scope and content of the appended claims. All patents, patent applications, publications, and literature references presented herein are incorporated by reference in their entireties for any disclosure pertinent to the practice of this invention, except that such incorporations by reference shall not change the meaning of any terms defined in this application. All parts and percentages in the examples are on a weight basis unless otherwise stated.

EXAMPLES

Five hundred gram vinyl acetate and ethylene-vinyl acetate adhesive formulations were made using an electric DISPERMAT LC mixer. Commercially available adhesives were used (vinyl acetate compositions in Table 1; ethylene-vinyl acetate compositions in Table 2) as specified below. The "Trade name" column in Tables 1 and 2 indicates the manufacturer's product name. The "Mfg." column indicates the manufacturer name. "Forbo" indicates Forbo Adhesives LLC, 523 Davis Drive, Suite 400, Durham, N.C. 27713 USA; "Celanese" indicates Celanese Emulsions Gmbh, Frankfurt, Germany; "Vinavil" indicates Vinavil SpA, Villadossola Italy; "Synthomer" indicates Synthomer Ltd., Essex, UK; and "Air Products" indicates Air Products Polymers GmbH&Co KG, Johannes-Hess-Str. 24, 84489 Burghausen, Germany.

Compositions containing plasticizer compounds were prepared by adding plasticizers to each adhesive via a pipette, constantly stirring over a period of approximately 2 minutes. The following plasticizers were used:

DnBT: A composition containing at least 96% by weight of di-n-butyl terephthalate, a $C_4$ to $C_8$ alkyl terephthalate.

DIBP: Di-isobutyl phthalate, PALATINOL IC by BASF grade (available from Samuel Banner Ltd, Hampton Court, Tudor Road, Manor Park, Runcorn, Cheshire, WA7 1TU, UK);

2088: BENZOFLEX 2088, a blend of diethylene glycol dibenzoate, dipropylene glycol dibenzoate and triethylene glycol dibenzoate, available from Velsicol Chemical Corp., 10400 W. Higgins Road Suite 600, Rosemont, Ill. 60018-3713, USA; and TXIB: EASTMAN TXIB, a plasticizer product containing 2,2,4-trimethyl-1,3-pentanediol diisobutyrate and available from Eastman Chemical Company, Kingsport, Tenn. USA.

Each formulation was blended at approximately 2000 rpm. Plasticizer was mixed into the compositions at 5% loading or 10% where indicated. For example, 50 grams of plasticizer would be added to 450 grams of compositions at 10% addition. In addition, 0.1% defoamer (Antifoam CF16, available from Blackburn Chemicals) and 0.1% biocide (Acticide SPX, available from) was included in each mix. The viscosity of the plasticized composition was then determined using a Brookfield viscometer at 23° C. and 20 rpm. Viscosity is reported in Centipoise (cps).

Results are presented in Tables 3 and 4 below. Data points that were not measured are indicated as "nm." Brookfield Viscosity was determined by ASTM Method D1084. Konig film hardness was determined by ASTM Method D4366. Minimum film-forming temperature (MFFT) was determined by ASTM Method D2354. Because the solutions were aqueous, any MTFT values recorded less than zero degrees Celsius are represented as zero degrees Celsius. In addition, values marked as "nm*" for MFFT were not measured as during these experiments but other available data indicate that the MFFT for similar compositions would have been at or below zero degrees Celsius. Glass transition temperature (Tg) was determined by ASTM Method D3418 and determined upon second heating of the composition.

TABLE 1

Polyvinyl Acetate Composition used in Testing

| Composition | Trade name | Mfg |
|---|---|---|
| P1 | VINAC DP55 | Synthomer |
| P2 | DUROSET C325 | Celanese |
| P3 | PACE 383 | Forbo |
| P4 | VINAMUL 8481 | Celanese |
| P5 | VINAVIL KA/R | Vinavil |
| P6 | VINAVIL CA/R | Vinavil |

TABLE 2

Ethylene-vinyl acetate Copolymer Compositions Used in Testing

| Composition | Trade name | Mfg |
|---|---|---|
| E1 | AIRFLEX EP400 | Air Products |
| E2 | DUROSET E200 | Celanese |
| E3 | DM 132 | Celanese |
| E4 | VINAMUL 3161 | Celanese |
| E5 | VINAMUL 3171 | Celanese |

TABLE 3

Results for poly(vinyl acetate) compositions

| | Viscosity cps 1 Day | Konig Hardness Oscillations | MFFT ° C. | Tg ° C. $2^{nd}$ Heat |
|---|---|---|---|---|
| P1 alone (control) | 3660 | 142 | 18 | 40 |
| P1 with 2088 (5%) | 6080 | 99 | 5 | 29 |
| P1 with 2088 (10%) | 10740 | 38 | 0 | 18 |
| P1 with DIBP (5%) | 6240 | 100 | 5 | 29 |
| P1 with DIBP (10%) | 10900 | 30 | 0 | 16 |
| P1 with TXIB (5%) | 6080 | 72 | 4 | 25 |
| P1 with TXIB (10%) | 8240 | 63 | 3 | 11 |
| P1 with TXIB/2088 50:50 (5%) | 5550 | 77 | 4 | 28 |
| P1 with TXIB/2088 50:50 (10%) | 10820 | 22 | 0 | 13 |
| P1 with DnBT (5%) | 5630 | 83 | 4 | 26 |
| P1 with DnBT (10%) | 9360 | 24 | 0 | 11 |
| P1 with DnBT:TXIB 30:70 (5%) | 5980 | 78 | 4 | 26 |
| P1 with DnBT:TXIB 30:70 (10%) | 9880 | 28 | 0 | 10 |
| P2 alone (control) | 2770 | 150 | 15 | 43 |

TABLE 3-continued

Results for poly(vinyl acetate) compositions

| | Viscosity cps 1 Day | Konig Hardness Oscillations | MFFT °C. | Tg °C. 2nd Heat |
|---|---|---|---|---|
| P2 with 2088 (10%) | 3800 | 42 | 0 | 19 |
| P2 with DIBP (10%) | 3890 | 34 | 0 | 17 |
| P2 with TXIB (10%) | 4200 | 65 | 2 | 11 |
| P2 with TXIB/2088 50:50 (10%) | 3950 | 24 | 0 | 13 |
| P2 with DnBT (10%) | 3810 | 22 | 0 | 12 |
| P3 alone (control) | 3720 | 146 | 14 | 40 |
| P3 with 2088 (10%) | 5800 | 32 | 0 | 15 |
| P3 with TXIB (10%) | 6450 | 50 | 2 | 11 |
| P3 with DnBT (10%) | 5900 | 21 | 0 | 8 |
| P4 alone (control) | 2640 | 144 | 18 | 43 |
| P4 with 2088 (5%) | 5020 | 91 | 7.6 | 29 |
| P4 with 2088 (10%) | 10700 | 29 | 0.5 | 18 |
| P4 with DIBP (5%) | 5040 | 72 | 5.7 | 27 |
| P4 with DIBP (10%) | 11360 | 14 | 0 | 12 |
| P4 with TXIB (5%) | 5380 | 75 | 6.4 | 28 |
| P4 with TXIB (10%) | 11740 | 41 | 5.4 | 13 |
| P4 with DnBT (5%) | 5190 | 79 | 7.2 | 27 |
| P4 with DnBT (10%) | 10760 | 19 | 1.3 | 14 |
| P4 with Eastman 168 (5%) | 4970 | 119 | 16.9 | 39 |
| P4 with Eastman 168 (10%) | 6740 | 72 | 17.2 | 35 |
| P5 alone (control) | 49600 | nm | 14 | 37.5 |
| P5 with DIBP (5%) | 68800 | nm | 2 | 21.0 |
| P5 with DIBP (10%) | 105200 | nm | 0 | 3.5 |
| P5 with DIBP (15%) | 121800 | nm | 0 | −9.7 |
| P5 with DnBT (5%) | 69000 | nm | 3 | 16.9 |
| P5 with DnBT (10%) | 95400 | nm | 0 | 4.0 |
| P5 with DnBT (10%) | 95400 | nm | 0 | 4.0 |
| P6 alone (control) | 41600 | nm | 15 | 38.7 |
| P6 with DIBP (5%) | 58400 | nm | 7 | 25.2 |
| P6 with DIBP (10%) | 108200 | nm | 0 | 8.1 |
| P6 with DIBP (15%) | 158600 | nm | 0 | 0.5 |
| P6 with DnBT (5%) | 63200 | nm | 7 | 24.3 |
| P6 with DnBT (10%) | 103200 | nm | 0 | 12.1 |
| P6 with DnBT (10%) | 103200 | nm | 0 | 12.1 |

TABLE 4

Results for ethylene-vinyl acetate copolymer compositions E1 and E2

| | Viscosity cps 1 Day | Konig Hardness Oscillations | MFFT °C. | Tg °C., 2nd Heat |
|---|---|---|---|---|
| E1 alone (control) | 2230 | 10 | nm* | 7.4 |
| E1 with 2088 (5%) | 5150 | 7 | nm* | −1.0 |
| E1 with 2088 (10%) | 11540 | 8 | nm* | −8.4 |
| E1 with DnBT (5%) | 5500 | 9 | nm* | −0.3 |
| E1 with DnBT (10%) | 13350 | 9 | nm* | −12.0 |
| E1 with DIBP (5%) | 5550 | 8 | nm | −3.5 |
| E1 with DIBP (10%) | 13100 | 9 | nm | −14.3 |
| E1 with TXIB (5%) | 5800 | 8 | nm | −4.2 |
| E1 with TXIB (10%) | 15300 | 11 | nm | −17.6 |
| E1 with Eastman 168 (5%) | 3636 | 10 | nm | −3.7 |
| E1 with Eastman 168 (10%) | 4640 | 10 | nm | −13.6 |
| E2 alone (control) | 2620 | 7 | 0 | 6 |
| E2 with 2088 (5%) | 4420 | 6 | 0 | −2 |
| E2 with 2088 (10%) | 9000 | 5 | 0 | −9 |
| E2 with DnBT (5%) | 4680 | 6 | 0 | −6 |
| E2 with DnBT (10%) | 9220 | 6 | 0 | −15 |
| E2 with DIBP (5%) | 4390 | 6 | 0 | −3 |
| E2 with DIBP (10%) | 9200 | 6 | 0 | −12 |
| E3 alone (control) | 7100 | nm | nm | nm |
| E3 with 2088 (5%) | 9500 | nm | nm | nm |
| E3 with 2088 (10%) | 18200 | nm | nm | nm |
| E3 with DnBT (5%) | 10100 | nm | nm | nm |
| E3 with DnBT (10%) | 19350 | nm | nm | nm |
| E3 with DIBP (5%) | 10600 | nm | nm | nm |
| E3 with DIBP (10%) | 19500 | nm | nm | nm |
| E3 with TXIB/2088 50:50 (5%) | 10700 | nm | nm | nm |
| E3 with TXIB/2088 50:50 (10%) | 18700 | nm | nm | nm |
| E3 with TXIB/DnBT 50:50 (5%) | nm | nm | nm | nm |
| E3 with TXIB/DnBT 50:50 (10%) | nm | nm | nm | nm |
| E4 alone (control) | 5150 | nm | nm | nm |
| E4 with 2088 (5%) | 9200 | nm | nm | nm |
| E4 with 2088 (10%) | 17100 | nm | nm | nm |
| E4 with DnBT (5%) | 9250 | nm | nm | nm |
| E4 with DnBT (10%) | 18100 | nm | nm | nm |
| E4 with DIBP (5%) | 9600 | nm | nm | nm |
| E4 with DIBP (10%) | 16700 | nm | nm | nm |
| E4 with TXIB/2088 50:50 (5%) | 9600 | nm | nm | nm |
| E4 with TXIB/2088 50:50 (10%) | 19000 | nm | nm | nm |
| E4 with TXIB/DnBT 50:50 (5%) | nm | nm | nm | nm |
| E4 with TXIB/DnBT 50:50 (10%) | nm | nm | nm | nm |
| E5 alone (control) | 2150 | nm | nm | nm |
| E5 with 2088 (5%) | 3250 | nm | nm | nm |
| E5 with 2088 (10%) | 5250 | nm | nm | nm |
| E5 with DnBT (5%) | 3650 | nm | nm | nm |

TABLE 4-continued

Results for ethylene-vinyl acetate copolymer compositions E1 and E2

|  | Viscosity cps 1 Day | Konig Hardness Oscillations | MFFT ° C. | Tg ° C., 2$^{nd}$ Heat |
|---|---|---|---|---|
| E5 with DnBT (10%) | 6850 | nm | nm | nm |
| E5 with DIBP (5%) | 2800 | nm | nm | nm |
| E5 with DIBP (10%) | 5050 | nm | nm | nm |
| E5 with TXIB/2088 50:50 (5%) | 3150 | nm | nm | nm |
| E5 with TXIB/2088 50:50 (10%) | 5250 | nm | nm | nm |
| E5 with TXIB/DnBT 50:50 (5%) | nm | nm | nm | nm |
| E5 with TXIB/DnBT 50:50 (10%) | nm | nm | nm | nm |

Having described the invention in detail, those skilled in the art will appreciate that modifications may be made to the various aspects of the invention without departing from the scope and spirit of the invention disclosed and described herein. It is, therefore, not intended that the scope of the invention be limited to the specific embodiments illustrated and described but rather it is intended that the scope of the present invention be determined by the appended claims and their equivalents. Moreover, all patents, patent applications, publications, and literature references presented herein are incorporated by reference in their entirety for any disclosure pertinent to the practice of this invention except to the extent that they would alter the meaning of any terms defined herein.

We claim:

1. An aqueous composition comprising:
   a) at least one vinyl acetate polymer; and
   b) di-n-butyl terephthalate.

2. The aqueous composition of claim 1 wherein the vinyl acetate polymer is a homopolymer of vinyl acetate residues.

3. The aqueous composition of claim 1 wherein the vinyl acetate polymer is a copolymer of ethylene and vinyl acetate residues.

4. The aqueous composition of claim 1 wherein the vinyl acetate polymer is a copolymer of ethylene and vinyl acetate residues and residues of at least one additional monomer.

5. The aqueous composition of claim 1 wherein the di-n-butyl terephthalate comprises at least about 6% of the dry weight of the aqueous composition.

6. The aqueous composition of claim 1 wherein the composition comprises between about 35% and about 55% by weight of water.

7. The aqueous composition of claim 1, further comprising at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

8. The composition of claim 1 further comprising triacetin, 2,2,4-trimethyl-1,3-pentanediol diisobutyrate, or a combination thereof.

9. An adhesive composition comprising:
   a) an aqueous solution; and
   b) particles suspended in a stable emulsion in the aqueous solution,
   wherein the particles comprise at least one vinyl acetate polymer and di-n-butyl terephthalate.

10. A method comprising:
    a) providing at least one stable emulsion of particles in an aqueous solution, wherein the particles comprise at least one vinyl acetate polymer; and
    b) combining the stable emulsion and di-n-butyl terephthalate.

11. An article comprising the adhesive composition of claim 1.

12. An article comprising the adhesive composition of claim 9.

13. The adhesive composition of claim 9 wherein the vinyl acetate polymer is a homopolymer of vinyl acetate residues.

14. The adhesive composition of claim 9 wherein the vinyl acetate polymer is copolymer of ethylene and vinyl acetate residues.

15. The adhesive composition of claim 9 wherein the vinyl acetate polymer is copolymer of ethylene and vinyl acetate residues and residues of at least one additional monomer.

16. The adhesive composition of claim 9 wherein the di-n-butyl terephthalate comprises at least about 6% of the dry weight of the adhesive composition.

17. The adhesive composition of claim 9 wherein the composition comprises between about 35% and about 55% by weight of water.

18. The adhesive composition of claim 9, further comprising at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

19. The adhesive composition of claim 9 further comprising triacetin, 2,2,4-trimethyl-1,3-pentanediol diisobutyrate, or a combination thereof.

20. The method of claim 10 wherein the vinyl acetate polymer is a homopolymer of vinyl acetate residues.

21. The method of claim 10 wherein the vinyl acetate polymer is copolymer of ethylene and vinyl acetate residues.

22. The method of claim 10 wherein the vinyl acetate polymer is copolymer of ethylene and vinyl acetate residues and residues of at least one additional monomer.

23. The method of claim 10 wherein the method comprises combining the stable emulsion and a sufficient amount of di-n-butyl terephthalate to form a resulting emulsion that contains the di-n-butyl terephthalate in an amount of at least about 6% of the dry weight of the emulsion after the combining.

24. The method of claim 10 wherein the emulsion comprises between about 35% and about 55% by weight of water after the combining.

25. The method of claim 10, further comprising combining the emulsion with at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

26. The method of claim 10 further comprising combining the emulsion with triacetin, 2,2,4-trimethyl-1,3-pentanediol diisobutyrate, or a combination thereof.

27. A method comprising forming an adhesive bond between two or more articles or two or more members of the same article, wherein forming the adhesive bond comprises applying a composition to one or more articles, to an opening in one or more articles, to a juncture, joint, or connection between two or more articles, to a juncture, joint, or connection between two or more members of one or more article or to a combination of two or more of the foregoing, wherein the composition is aqueous and comprises:
  a) at least one vinyl acetate polymer; and
  b) at least one plasticizer comprising at least one $C_4$ to $C_8$ alkyl terephthalate, wherein the $C_4$ to $C_8$ alkyl terephthalate is present in an amount of at least 6% based on the dry weight of the composition.

28. The method of claim 27 wherein the vinyl acetate polymer is a homopolymer of vinyl acetate residues.

29. The method of claim 27 wherein the vinyl acetate polymer is copolymer of ethylene and vinyl acetate residues.

30. The method of claim 27 wherein the vinyl acetate polymer is a copolymer of ethylene and vinyl acetate residues and residues of at least one additional monomer.

31. The method of claim 27 wherein at least one $C_4$ to $C_8$ alkyl terephthalate comprises at least about 6 weight % of the dry weight of the composition.

32. The method of claim 27 wherein at least one $C_4$ to $C_8$ alkyl terephthalate is di-n-butyl terephthalate.

33. The method of claim 27 wherein the composition comprises between about 35% and 55% by weight of water.

34. The method of claim 27, wherein the composition further comprises at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

35. The method of claim 27 wherein the composition further comprises triacetin, 2,2,4-trimethyl-1,3-pentanediol diisobutyrate, or a combination thereof.

36. A method comprising forming an adhesive bond between two or more articles or two or more members of the same article, wherein forming the adhesive bond comprises applying a composition to one or more articles, to an opening in one or more articles, to a juncture, joint, or connection between two or more articles, to a juncture, joint, or connection between two or more members of one or more article or to a combination of two or more of the foregoing, wherein the composition is aqueous and comprises:
  a) at least one vinyl acetate polymer; and
  b) di-n-butyl terephthalate.

37. The method of claim 36 wherein the vinyl acetate polymer is a homopolymer of vinyl acetate residues.

38. The method of claim 36 wherein the vinyl acetate polymer is a copolymer of ethylene and vinyl acetate residues.

39. The method of claim 36 wherein the vinyl acetate polymer is a copolymer of ethylene and vinyl acetate residues and residues of at least one additional monomer.

40. The method of claim 36 wherein the di-n-butyl terephthalate comprises at least about 6% of the dry weight of the composition.

41. The method of claim 36 wherein the composition comprises between about 35% and about 55% by weight of water.

42. The method of claim 36, wherein the composition further comprises at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

43. The method of claim 36 wherein the composition further comprises triacetin, 2,2,4-trimethyl-1,3-pentanediol diisobutyrate, or a combination thereof.

44. A method comprising forming an adhesive bond between two or more articles or two or more members of the same article, wherein forming the adhesive bond comprises applying a composition to one or more articles, to an opening in one or more articles, to a juncture, joint, or connection between two or more articles, to a juncture, joint, or connection between two or more members of one or more article or to a combination of two or more of the foregoing, wherein the composition comprises:
  a) an aqueous solution; and
  b) particles suspended in a stable emulsion in the aqueous solution,
wherein the particles comprise at least one vinyl acetate polymer and at least one $C_4$ to C8 alkyl terephthalate, and the at least one $C_4$ to $C_8$ alkyl terephthalate is present in an amount of at least 6% based on total dry components of the composition.

45. The method of claim 44 wherein the vinyl acetate polymer is a copolymer of ethylene and vinyl acetate residues.

46. The method of claim 44 wherein the vinyl acetate polymer is a copolymer of ethylene and vinyl acetate residues and residues of at least one additional monomer.

47. The method of claim 44 wherein the di-n-butyl terephthalate comprises at least about 6% of the dry weight of the adhesive composition.

48. The method of claim 44 wherein the composition comprises between about 35% and about 55% by weight of water.

49. The method of claim 44, wherein the method further comprises at least one additional plasticizer selected from acetyl tributyl citrate, butyl benzyl phthalate, butyl phthalyl butyl glycolate, di-n-butyl phthalate, diisobutyl phthalate, 2,2,4-trimethyl-1,3-pentanediol diisobutyrate, dibutyl sebacate, diethyl phthalate, diethylene glycol dibenzoate, dipropylene glycol, dipropylene glycol dibenzoate, ethyl phthalyl ethyl glycolate, ethyl-p-toluene sulfonamide, hexylene glycol, ethyl phthalyl ethyl glycolate, polyoxyethylene aryl ether, tributoxyethyl phthalate, 2,2,4-trimethyl-1,3-pentanediol diisobutyrate, triacetin, triethylene glycol dibenzoate and phthalic acid, or combinations of two or more of the foregoing.

50. The method of claim 44 wherein the composition further comprises triacetin, 2,2,4-trimethyl-1,3-pentanediol diisobutyrate, or a combination thereof.

\* \* \* \* \*